May 9, 1961    E. LOEB ET AL    2,983,660
FABRICATION OF TUBE TYPE FUEL ELEMENT FOR NUCLEAR REACTORS
Filed Feb. 4, 1959    7 Sheets-Sheet 1
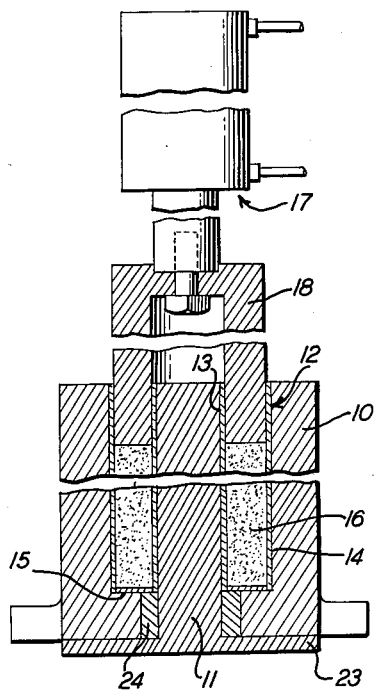
FIG 1.
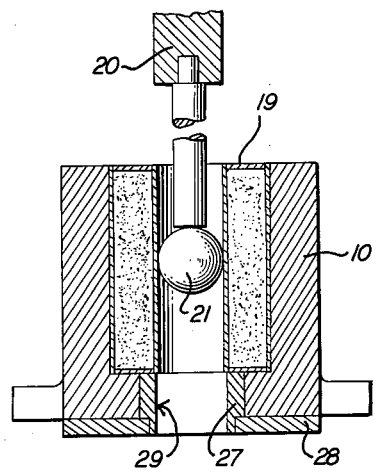
FIG 1A.
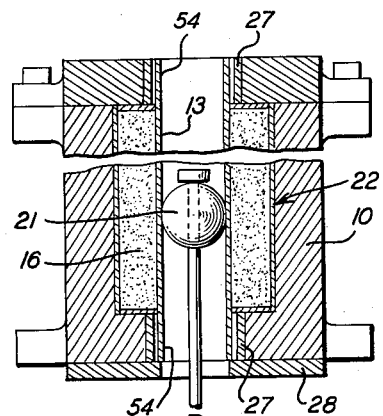
FIG 2.
FIG 3.
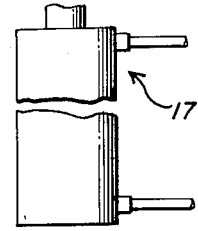
INVENTORS.
ERNEST LOEB
JOHN H. NICKLAS
BY
*[signature]*
ATTORNEY

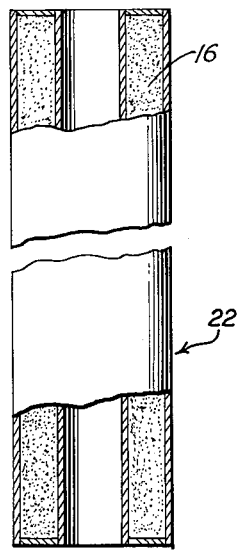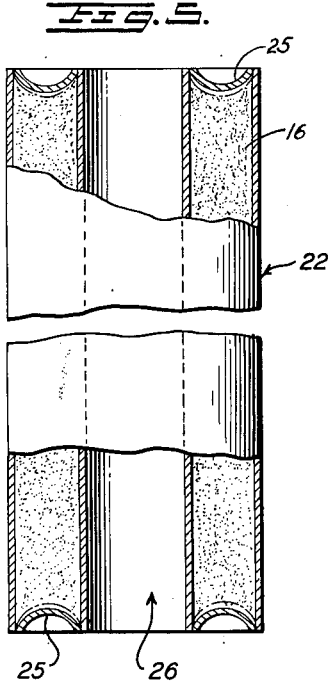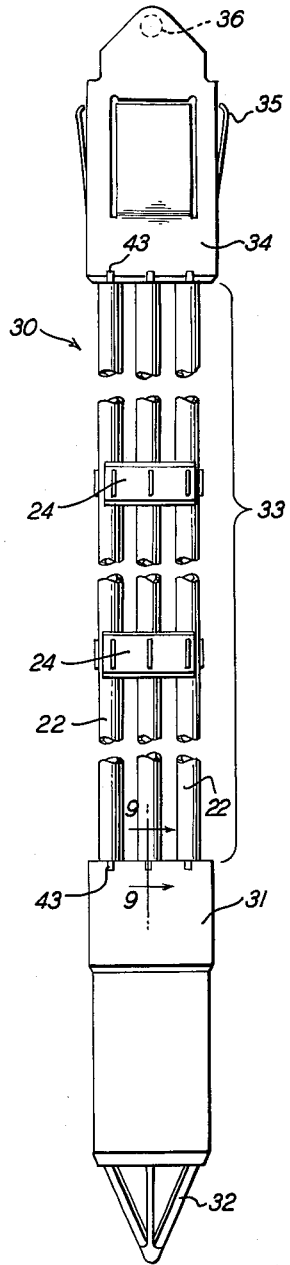

May 9, 1961 E. LOEB ET AL 2,983,660
FABRICATION OF TUBE TYPE FUEL ELEMENT FOR NUCLEAR REACTORS
Filed Feb. 4, 1959 7 Sheets-Sheet 3
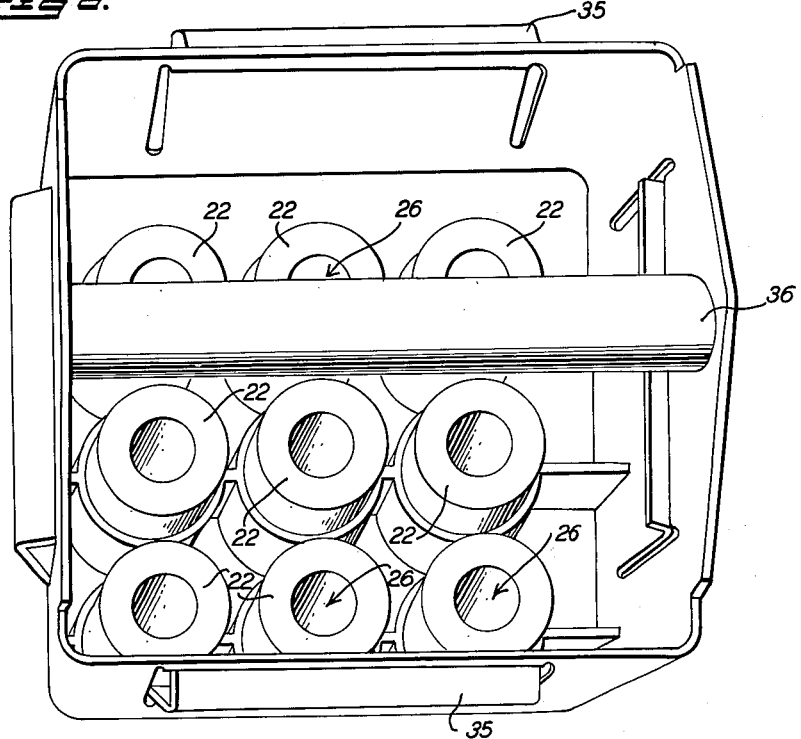
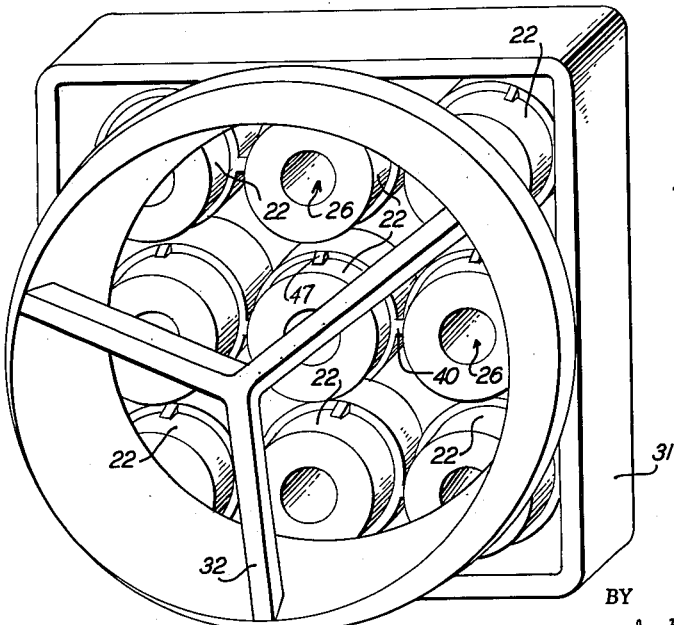
INVENTORS.
ERNEST LOEB
JOHN H. NICKLAS
BY
*A. Fredrick Namann*
ATTORNEY

INVENTORS.
ERNEST LOEB
JOHN H. NICKLAS
BY
ATTORNEY

May 9, 1961 E. LOEB ET AL 2,983,660
FABRICATION OF TUBE TYPE FUEL ELEMENT FOR NUCLEAR REACTORS
Filed Feb. 4, 1959 7 Sheets-Sheet 5
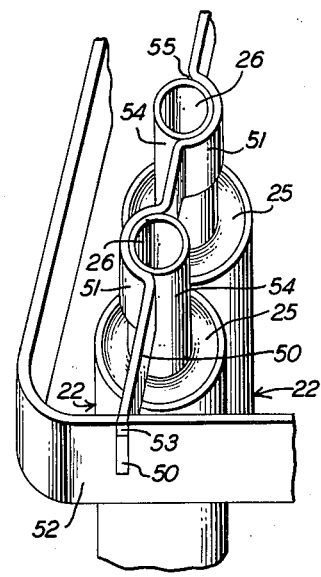
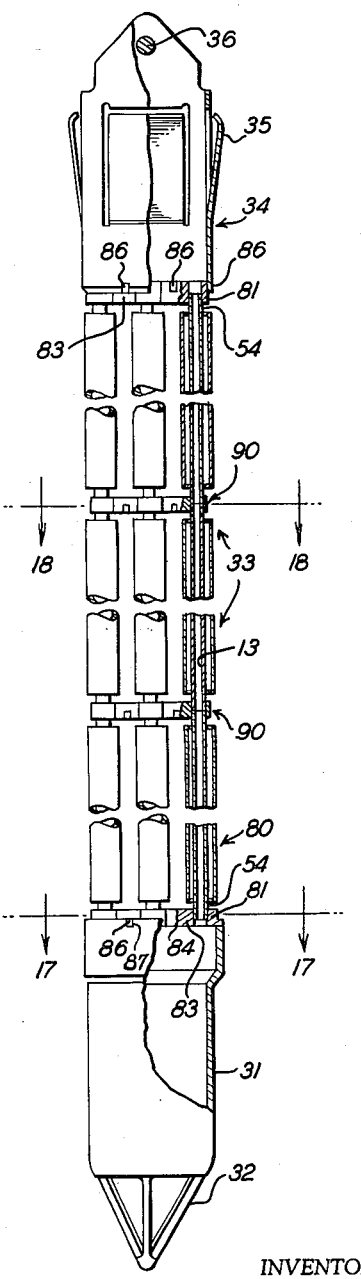
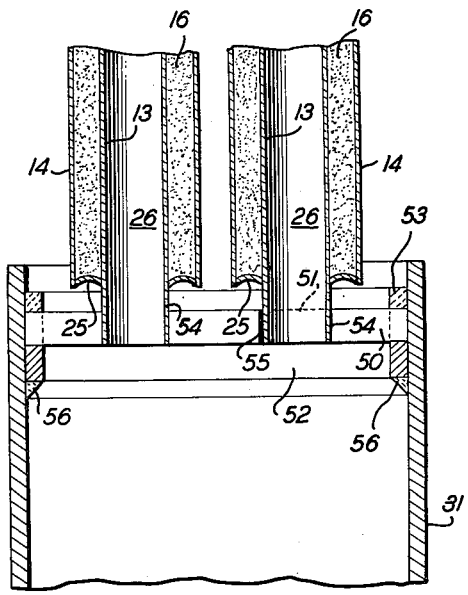
INVENTORS.
ERNEST LOEB
JOHN H. NICKLAS
BY
N. Frederick Lamann
ATTORNEY

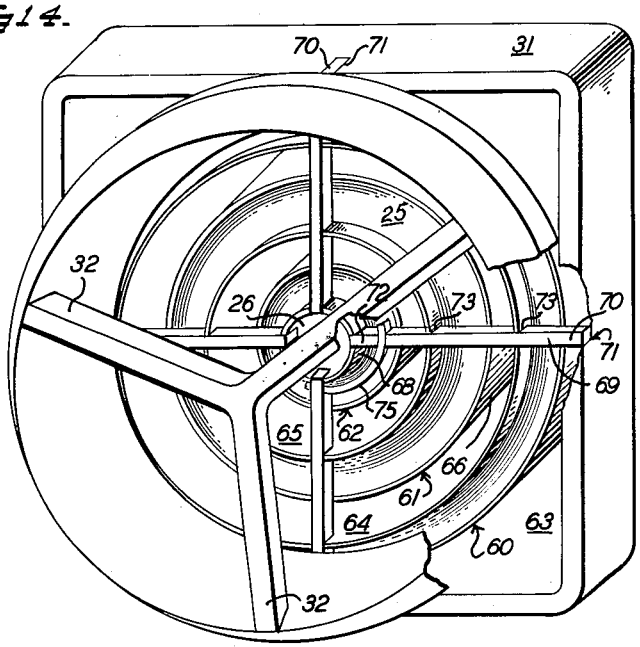
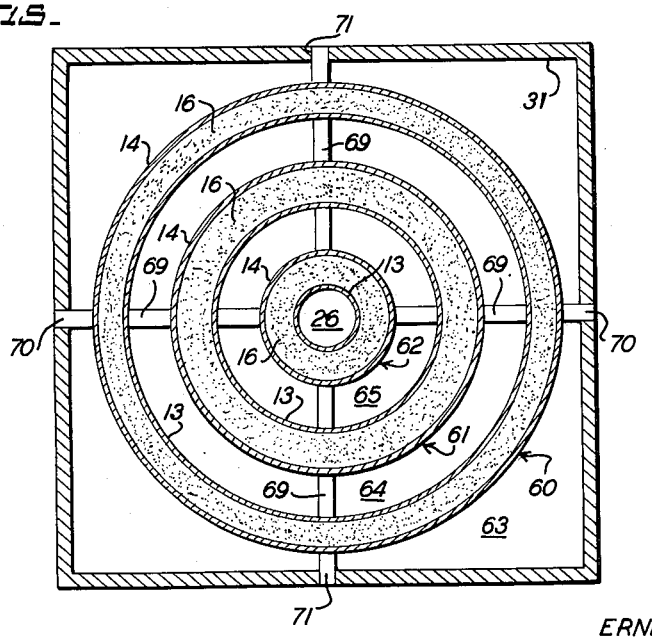

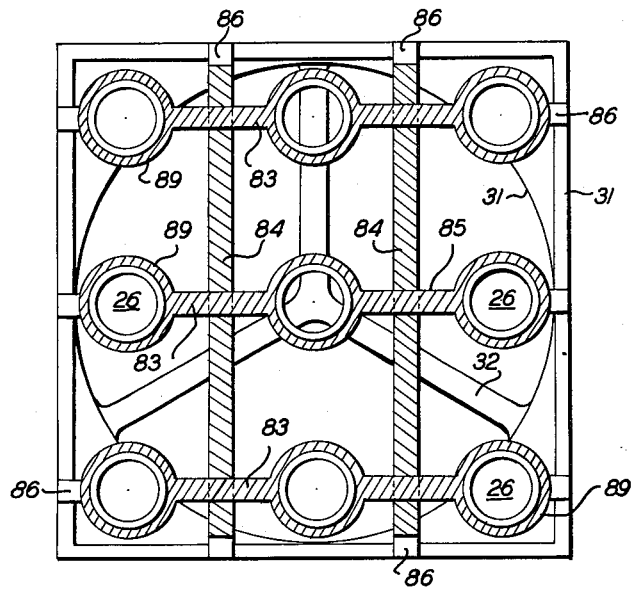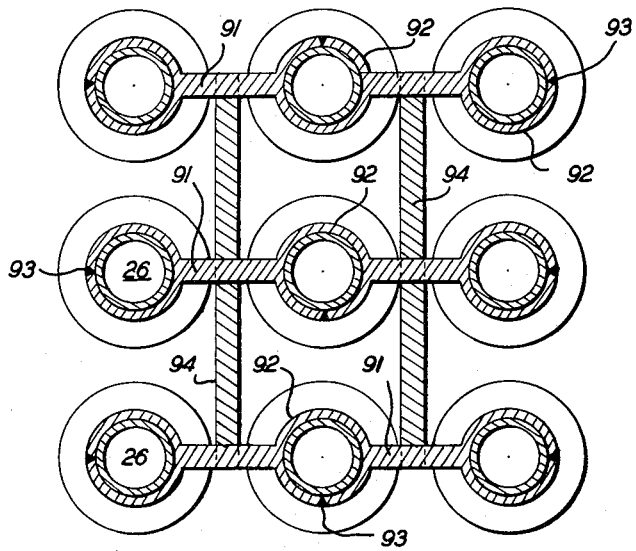

United States Patent Office 2,983,660
Patented May 9, 1961

2,983,660

FABRICATION OF TUBE TYPE FUEL ELEMENT FOR NUCLEAR REACTORS

Ernest Loeb, Silver Spring, and John H. Nicklas, Riverdale, Md., assignors, by mesne assignments, to the United States of America as represented by the United States Atomic Energy Commission Filed Feb. 4, 1959, Ser. No. 791,058

4 Claims. (Cl. 204—154.2)

The present invention relates to nuclear reactor fuel elements and, more particularly, to oxide containing fuel elements and methods and apparatus for fabricating them.

Fuel elements of the prior art, generally, require a layer of fissionable metal or metal alloy containing substance roll bonded or otherwise sealed between layers of non-fissionable, relatively inert substances, or call for the use of precision ground fissionable material containing substances in the form of pellets which are sealed within a container. These and other types of fuel elements of the prior art involve the creation of metallurgical or mechanical bonds sometimes through the use of a heat transfer medium in order to provide good heat removal characteristics. Further, it is only in the case of the relatively more expensive pellet-form construction that the desirable handling safety and neutronic characteristics of the oxides of the fissionable material can be fully utilized.

The present invention utilizes fuel containing powder compacted in tubes, constructed of aluminum, stainless steel, zirconium alloys or equivalent material, and, therefore, markedly reduces the cost over the standard roll-bonded zirconium-clad plates or pellet containing tubular fuel elements.

It should be noted that as much as a 15 to 20 kg. reduction in critical mass is obtainable with the fuel elements of the preferred embodiment of the present invention compared to the standard boiling water reactor, as described hereinafter, when the preferred fuel elements are constructed of aluminum tubing. Aluminum, although always known to be desirable, can not be utilized in the fuel elements of the prior art because of the exceedingly high adverse temperature characteristics which are alleviated by the present invention as described hereinafter.

Uranium oxide as used in the present invention is generally more resistant to fission damage than metal alloys, and will function properly to at least about 15,000 megawatt days per ton of oxide. Further, since the method and apparatus of the present invention provides for attaining 95 percent or more of theoretical density, the fission gases are confined within the lattice thereby reducing fission gas pressure build up over a particular time. The compacted powder type fuel element of the present invention also has operational stability with reference to vibration. Further, the fuel element of the present invention is dimensionally stable, although there has been a reduction of about one half in the structural material over prior art fuel element assemblies.

The present invention is directed to a fuel element and method of making it which not only eliminates the disadvantages of the prior art fuel elements but also provides for the use of oxides of the fissionable material in powder form without any requirement for pellets, pellet grinding, or ordinary sintering.

Therefore, it is the broad object of the present invention to provide a nuclear reactor fuel element utilizing oxides of fissionable material said oxides having a predetermined density.

It is a further object of the present invention to provide a method of fabricating a nuclear reactor fuel element utilizing oxides of fissionable material in which said material has any one of a variety of predetermined densities.

It is a still further object of the present invention to provide a fuel element and method of making it which does not require high precision tooling, has reduced fabrication costs, and a minimum of handling of the fissionable material containing substances.

A still further object of the present invention is to provide a nuclear reactor fuel element and method of making it which substantially reduces the peak core temperatures while materially enhansing the heat removal characteristics.

Another object of the present invention is to provide a nuclear reactor fuel element and method of making it which materially improves the heat removal characteristics of the reactor in which it is used by increasing the heat transfer area and reducing the temperature gradients.

A further object of the present invention is to provide a fuel element in which the fuel is in intimate contact with the confining walls to materially enhance heat transfer.

A further object of the present invention is to provide a fuel element in which fissionable material in the oxide form is contained within tubes thereby materially decreasing the critical mass requirements of a reactor.

The invention embodies other novel features, details of construction and arrangement of parts which are hereinafter set forth in the specification and claims and illustrated in the accompanying drawings, which are hereby made a part of the specification, wherein:

Fig. 1 is a sectional view of the loading apparatus utilized in the method of the present invention.

Fig. 1A is a sectional view of the ball swaging apparatus.

Fig. 2 is a sectional view of another ball swaging apparatus utilizing the method of the present invention.

Fig. 3 is a sectional view of a hydraulic compacting apparatus.

Fig. 4 is a sectional view of a fuel element of the present invention.

Fig. 5 is a sectional view of a modification of the fuel element of the present invention.

Fig. 6 is a side view of a fuel element assembly of the preferred embodiment.

Fig. 7 is a perspective end view of the fuel element assembly of the present invention showing the coolant inlet and fuel element array.

Fig. 8 is a perspective end view of the fuel element assembly of the present invention showing the coolant outlet and fuel element array.

Fig. 12 is a perspective view of a modified fuel pin supporting grid.

Fig. 13 is a cross sectional view of fuel pin arrangement of Fig. 12.

Fig. 14 is a perspective view of the lower end of a concentric fuel pin array.

Fig. 15 is a sectional view of Fig. 14.

Fig. 16 is a partially sectional view of a fuel element assembly showing the fuel pins short length utilized in an assembly.

Fig. 17 is a sectional view along line 17—17 of Fig. 16.

Fig. 18 is a sectional view along line 18—18 of Fig. 16.

Figure 9:
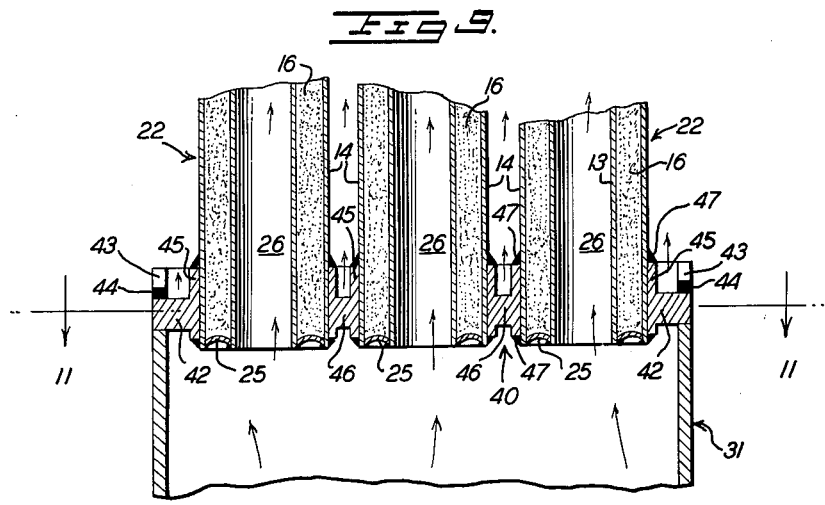
Fig. 9 is a sectional view along lines 9—9 of Fig. 6.

The fuel pins fabricated by the hereinafter described process may be utilized in a variety of nuclear reactors both gas and liquid cooled. Only one specific example of a reactor will be given herein and such example is not intended as limiting the use of such a fuel pin, since in view of this description many uses will be apparent to those skilled in the art.

The following dimensional data and fuel element characteristics are approximate and are included as an example for a reactor, specifically, a boiling water reactor of the type disclosed in "EBWR Experimental Boiling Water Reactor" (Atomic Energy Commission) ANL-5607, May 1957, the disclosure of which is incorporated herein and made a part hereof, utilizing the fuel elements of the present invention. The critical mass of such a reactor may be reduced by at least about ten percent by utilizing the aluminum or zirconium alloys tube type fuel element of the present invention.

Even if the stainless steel tubing is utilized, although the critical mass reduction would be relatively small, the increased heat transfer performance is very advantageous.

The aluminum alloys contemplated are the M-388, X8001 or similar high strength, high temperature, corrosion resistant types.

Average thermal flux in core:
   Clean operating core
     (58.5 MW) _____ $1.19 \times 10^{13}$ n/cm.$^2$/sec.
   End of core life (58.5
     MW) _____ $1.55 \times 10^{13}$ a/cm.$^2$/sec.
Volume fraction of $UO_2$ to $ThO_2$:
   At startup _____ 3.79.
   At end of core life _____ 2.91.
Percent burnup of $U^{235}$ (15
   mos.) _____ 23.1.
Conversion Ratio:
   At startup _____ 0.47.
   At end of core life (15
     mos.) _____ 0.55.
Fuel Elements:
   Tube I.D. _____ 0.500.
   Tube wall thickness
    (final):
     Inside _____ .032".
     Outside _____ .032".
Thoria-urania thickness_ .1875.
Total effective powder
   length _____ 60".

Number of rods per
   element _____ 9.
Total number of fuel
   elements _____ 148.
Total number of rods ___ 1332.
Composition — Thoria
   + at least_____ 90% enriched urania.
Thoria density _____ 95% theoretical.
Urania density _____ 95% theoretical.
Tube composition _____ 304 stainless steel ELC.

*Performance characteristics*

Heat absorbed in boiling ___ $173 \times 10^6$ B.t.u./hr.
Heat absorbed in heater
   water _____ $24.8 \times 10^6$ B.t.u./hr.
   Total _____ 197.8 B.t.u./hr. (53.2 kw.)

Reactor power (thermal-
   working) _____ 58.8 MW.
Average power density in
   coolant _____ 39.6 kw./liter.
Average inlet velocity ____ 4.05 ft./sec.
Average heat flux _____ 89,800 B.t.u./hr. ft.$^2$
Total steam rate _____ 258,000 lb./hr.
System pressure _____ 875 p.s.i.g.
Boiling temperature _____ 531° F.
Inlet water temperature ___ 528.1° F.
Feedwater return tempera-
   ture _____ 449° F.

Maximum flux environment:
   Heat flux _____ 89,800 B.t.u./hr. ft.$^2$
   Boiling fluid temp. ___ 531° F.
   Aluminum outside sur-
    face temp. (both in-
    side and outside
    tubes) _____ 566° F.
   Aluminum inside sur-
    face temp. (both in-
    side and outside
    tubes) _____ 618° F.
   Surface temp. of tho-
    ria-urania (both in-
    side and outside)___ 700° F.
   Center temp. of thoria-
    urania _____ 1,240° F.

*Table I*

| No. Fuel Pins Per Assembly | Assembly Array, inches | Dist. Between Centers of Pins, inches | Length, inches | Pin, O.D., inches | Outside Wall Thickness, inches | I.D., Initial, inches | Inside Wall Thickness, Initial, inches | I.D., Final, inches | Inside Wall Thickness, Final, inches | $UO_2$ Thickness, inches |
|---|---|---|---|---|---|---|---|---|---|---|
| 16 | 4x4 | 15/16 | 60 | 3/4 | .032 | 7/32 | .064 | 3/8 | .032 | 1/8 |
| 9 | 4x4 | 1 1/4 | 60 | 1 | .032 | 1/4 | .064 | 1/2 | .032 | 3/16 |
| 4 | 4x4 | 2 | 60 | 1 3/4 | .032 | 9/16 | .052 | 1 | .032 | 5/16 |
| 1 | 4x4 | | 60 | 4 | .062 | 2 1/2 | .075 | 3 | .062 | 7/16 |
| Concentric (3) | 4x4 | | 60 | 4, 2 1/2, 1 3/8 | .062, .047, .032 | 2 1/2, 1 1/2, 1/2 | .075, .057, .057 | 3, 1 7/8, 7/8 | .062, .047, .032 | 7/16, 7/32, 1/4 |

*Table II*

| No. Fuel Pins Per Assembly | $UO_2$ Density Cold Press | | $UO_2$ Density Swaged | | Vol. of $UO_2$ Per Tube (Cubic Inches) | Vol. of $UO_2$ Per Assembly (Cubic Inches) | Surface Area/Tube (Sq. In.) | Surface Area/Assembly (Sq. In.) |
|---|---|---|---|---|---|---|---|---|
| | grm./cc. | Percent Theoretical | grm./cc. | Percent Theoretical | | | | |
| 16 | 7.13 | (65) | 10.42 | (95) | 12.6 | 202 | 211 | 3,380 |
| 9 | 7.13 | (65) | 10.42 | (95) | 26.4 | 238 | 283 | 2,542 |
| 4 | 7.13 | (65) | 10.42 | (95) | 81.0 | 324 | 519 | 2,080 |
| 1 | 7.13 | (65) | 10.42 | (95) | 282.0 | 282 | 1,320 | 1,320 |
| Concentric (3) | 7.13 | (65) | 10.42 | (95) | 282, 128, 53 | 463 | 1,320, 825, 425 | 2,570 |

Table III

| No. Fuel Pins Per Assembly | Fluid, Temp., °F. | Outside Clad Temp., °F. | Inside Clad Temp., °F. | Outside UO₂ Temp., °F. | Center UO₂ Temp., °F. (Max.) |
|---|---|---|---|---|---|
| 16 | 531 | 566 | 618 | 700 | 830 |
| 9 | 531 | 566 | 618 | 700 | 1,240 |
| 4 | 531 | 566 | 618 | 700 | 2,070 |
| 1 | 531 | 566 | 618 | 700 | 2,900 |
| Concentric (3) | 531 | 566 | 618 | 700 | 2,900, 1,400, 1,600 |

Tables I through III show the various parameters for various arrangements of fuel pins of the present invention. The assembly array dimensions of 4″ x 4″ refers to outside dimensions of the coolant inlet fitting which defines the maximum fuel element width and depth for the preferred embodiment. The length in all of the examples given is taken as 60″, however, other lengths may be fabricated in accordance with the present invention. It is also apparent that the pin O.D., I.D., wall thicknesses and $UO_2$ thickness may be varied over a wide range of combinations. Only a few examples are given to simplify explanation.

$UO_2$ as used in these tables means a solid solution of $UO_2$-$ThO_2$ in powder form, 375 mesh being preferred. Additive as described hereinafter may be utilized without substantially changing the described characteristics. The temperature on the inside and outside surfaces of the inside and outside concentric tubes are the same within a few degrees. The inside and outside surface temperatures of the fuel are also the same within a few degrees. However, the temperature peak, based upon heat transfer consideration will be slightly displaced from the geometric center of the fuel thickness due to the lower heat transfer area in the center concentric tube.

The $UO_2$ densities, after cold pressing and after swaging as shown in Table II, may also be varied over relatively wide ranges depending upon the reactor purpose and nuclear considerations. It is also apparent that the volume of $UO_2$ per pin, volume of $UO_2$ per assembly, surface area of each pin and surface area of each assembly may also be varied.

The range between fluid temperature and outside clad temperature is due to the Reynolds number or film coefficient, while the range between inside clad temperature and outside ceramic temperature is taken as the worst case. The difference between outside ceramic temperature and the maximum temperature at the center of the fuel containing powder is due to thermal conductivity.

A comparison with the pellet type fuel element emphasizes the advantages of the present invention, particularly, in the decreased range of temperature of the present invention over the prior art fuel element construction between the inside clad temperature and outside $UO_2$ temperature (Table III) which, in the present invention, is less than 100° maximum and which, in the pellet case, may be as high as or higher than 800° F. Furthermore, the center temperature of the fuel has been reduced by about 1000° F. These reductions of temperature mean that there is less thermal cycling of the fuel and therefore greater stability, reduced internal pressures and, therefore, less chance of leaks or structural failures during operation. Furthermore, since the surface temperature of the thoria-urania has been reduced from about 1400° F. to 700° F., it is now possible to utilize aluminum and therefore take advantage of its excellent nuclear characteristics, an advantage which has not been realized in prior art power reactor fuel elements.

Fission gas release by compacted $UO_2$, or other fissionable material containing oxides, is one of the fundamental problems in the selection of a containing material. However, since 95 percent theoretical density is attained in the pressing and swaging processes described hereinafter the fission gases created during irradiation in the fuel body are trapped by the closely compacted structure. However to insure that the passageways between crystals are sealed additives such as $TiO_2$, CaO, MgO, or similar compounds in an amount of from about .01 to about 0.1 w/o are added to the powder. These additives in these small amounts do not appreciably affect the neutronic characteristics and serve to decrease the porosity and contain the fission gases within sealed chambers between crystals within the fissionable material containing powder. In this manner the pressure created on the confining cylinders is drastically reduced and the possibility of fuel tube rupture during operation is correspondingly reduced.

Referring now to Fig. 1 in a die 10 or other rigid cup shaped element, having a removable center post 11 having a base 23 and an insert 24 thereby defining a cylindrical chamber, is placed a metal, preferably stainless steel, fuel cylinder 12 having inner 13, outer 14 and bottom 15 walls. The metal fuel cylindrical cup 12 is filled with a powder containing an oxide of fissionable material 16, e.g., $UO_2$ or $UO_2$-$ThO_2$, and a hydraulic ram 17 having a cylindrical ramming head 18 is actuated downwardly to compress the powder 16. Pressures up to the order of 50 TSi are contemplated. The head 18 is lifted and additional powder in measured quantities is added and the ram is again actuated to compress the added powder. This process is continued until the exact amount of powder is contained in the fuel container 12.

Since the volume and weight of the cup 12 can be measured very accurately and because the starting volume of powder as well as its weight is accurately determinable it is possible by this method to achieve the exact initial density in the cup 12 which might be desired.

After the predetermined density has been reached in the loading process shown in Fig. 1, a top washer shaped lid 19, see Fig. 1A, is welded over the open end. The container may then be tested for leaks or imperfections.

The swaging process may then be started by removing the center post 11 and replacing insert 24 with an insert 27 having a base 28 which has an opening 29 the size of the ball utilized in this step of the swaging processes bringing the ram head 18 into contact with the lid 19 may be desirable to prevent distortion of the lid 19 in the subsequent steps.

A central ram head 20 is then actuated to push, Fig. 1A or pull Fig. 2, a ball or series of balls 21 through the opening left by the removal of the center post 11. The ball 21 is of various sizes depending upon whether it is the first or subsequent swaging pass. Thus, the first ball would be .005″ larger in diameter than the initial opening, for the ¾″ O.D., 7/32 I.D. (initial) embodiment (see Charts I through III), and several balls of this diameter may be used at the same time to insure that no buckling of the inner wall 13 of the metal cylindrical cup 12 is taking place. Subsequent balls 21 or a series of balls 21 of increasing dimensions, of about .005″ each per step or more, are passed through the cup or fuel element 12 until the desired final density is attained. This final density is readily determined by the decrease in the volume within the fuel pin 22 resulting from the swaging process. For the larger diameter embodiments of Charts I through III larger steps of the order of .010″ or larger may be used. See "Ballizing" Machine Design, November 13, 1958, pgs. 137–140 for a general description of ball swaging. Figure 2 also shows the apparatus modifications used in the fabrication of fuel pins having a tubular extension 54 of the inner wall 13. These dies shown in Figures 1 and 2 may be longitudinally separable for easy removal and insertion of the fuel cylinders.

The loading process is preferably done in a dry box and in a high vacuum to prevent contamination of the surrounding area and to remove gas from the powder. The swaging process is performed in a similar environment and at room temperature or at a temperature of from about 100° F. to about 500° F. for aluminum and up to about 1200° F. for stainless steel containers.

Figure 3 shows a modified compacting apparatus wherein the die 10 has upper and lower plates 28a and insert 24a. The upper plate 28a has a hydraulic line 37 and jump 38 for injecting a fluid into the volume 39 to expand the inner wall 13 and compress the fissionable material 16 to the desired final density.

The completed fuel pin as shown in Fig. 4 has a unitary mass of fissionable material containing substance 16 and may then be individually leak tested in accordance with standard techniques.

One of the problems which arises in the above described process is distortion of the bottom wall 15 and top lid 19 during the swaging step. Extreme care must be taken to prevent this distortion. An alternative end closure which may be used in place of the bottom wall 15 and top lid 19 is shown in Fig. 5. In this modification an end closure 25 having a convex surface toward the powder 16 is utilized to close the annular volume of the cup or fuel pin 22 at both ends. In this manner as the swaging balls are passed through the central aperture the end closures bow inwardly to allow the balls to pass without destroying the integrity of the seals or welds between the walls and the end closures. In utilizing the end closure, as shown in Fig. 5, it is desirable to provide a mating surface in the bottom of the die 10 to prevent undue distortion of the end closure 25 during the loading step. Furthermore, it will be apparent from the description above that the end closures 25 are particularly adapted to allow for differential expansion during use of the fuel pin in a reactor and also to accommodate fission gases created within the fuel pin during use.

Fig. 6 shows the preferred fuel element assembly 30 of the present invention in which a square array of nine individual fuel pins or fuel cylinders 22 are supported. The assembly 30 consists in general of a coolant inlet fitting 31 including a nozzle 32, a fuel containing section 33, consisting of nine fuel pins 22 in this embodiment, and an upper fuel handling adapter 34 having spring side members 35 and lifting bar 36. Tabs 24 may be utilized to interconnect the tubes intermediate their ends.

Fig. 7 is a perspective view looking through the coolant inlet fitting 31 which shows the fuel pins 22 around which the coolant flows with their central apertures 26 through which the coolant flows. The fuel pins 22 are supported in spaced relation by a grid structure 40 described hereinafter in detail with respect to Fig. 9.

Fig. 8 is a perspective view looking down into the fuel handling adapter showing the lifting bar 36, spring side members 35 and the upper extremity of the fuel pins 22 and the coolant outlet apertures or central apertures 26. The fuel pins 22 are supported in spaced relation by a grid structure 41 similar to the lower grid structure 40.

Referring now to Fig. 9 which is a sectional view along line 9—9 of Fig. 6, the fuel pins 22 are supported in spaced relation by a grid structure preferably aluminum indicated generally as 40. The grid 40 has two end bars 42 which fit into slots 43 in coolant inlet fitting 31 at its upper extremity. The end bars are welded, brazed or otherwise secured to inlet fitting 31 as at 44. The end bars are secured to cylindrical fittings 45 which in the preferred embodiment number three for each pair of end bars 42. The cylindrical fittings are connected at diametrically opposite sides by spacer bars 46 which are diametrically opposite to the end bars 42.

Each fuel pin 22 is welded, brazed or otherwise attached as at 47 to the cylindrical fitting at one or more spots so that it will be securely held against longitudinal movement by such an attachment and held against lateral movement by the grid 40. The coolant flow in Fig. 9 is indicated by the arrows.

Figure 10:
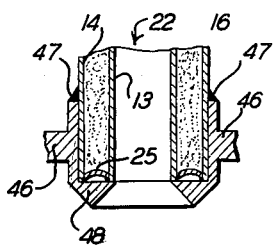
Fig. 10 is a detail view of a modification of the lower grid structure.

Fig. 10 shows a modification of the grid 40 in which a conical cross section flow guide and fuel cylinder support 48 is added to facilitate assembly and prevent coolant turbulence caused by the end closures 25 thereby enhancing coolant flow. Such a flow guide need only be used on the inlet side of the fuel assembly.

Figure 11:
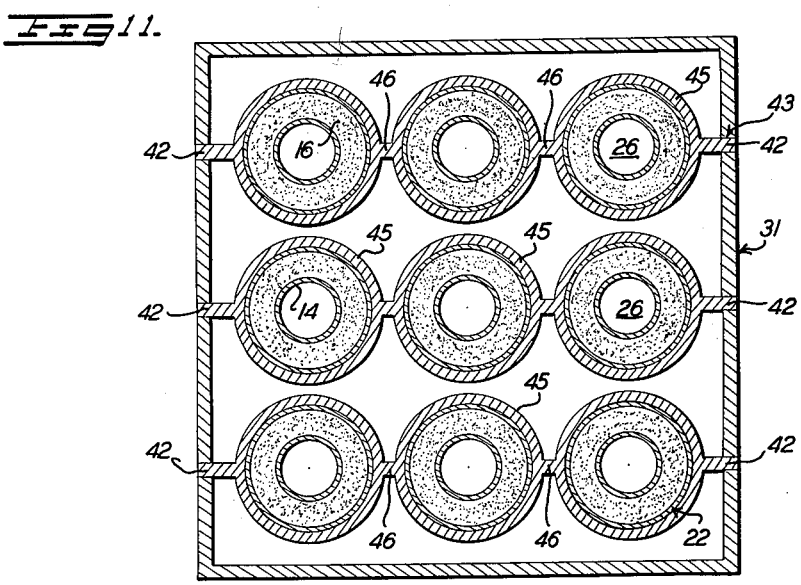
Fig. 11 is a sectional view along lines 11—11 of Fig. 9.

Fig. 11 is a section along lines 11—11 of Fig. 9. From this figure it is apparent that in the preferred embodiment the fuel assembly is made up of three sub-assemblies each sub-assembly containing three fuel pins 22. Thus, in this manner each fuel pin 22 is individually tested and checked, then is assembled into the sub-assembly which is further tested to determine if any leaks have developed during handling and assembly procedures. After each sub-assembly is checked, it is apparent that all welding, brazing, etc., is done at points remote from the fuel pin so that the likelihood of a leak developing in the final stages of assembly is virtually eliminated.

The sub-assemblies are placed in their proper slot 43 position and welded in place in the coolant inlet fitting. The upper grid structure 41 is the same as grid 40 so that the fuel handling adapter, also having slots 43, is placed over the upper grid and welded or brazed in place.

Fig. 12 is a perspective view of a modified bottom grid 50 which has semi-circular portions 51 along its length. The grid 50 has a slotted brace 52 to which the grid 50 is welded as at 53. The fuel pin 22 is constructed to have an extension 54 of the inner tube 13 which is welded as at 55 to the semi-circular portion 51. In this manner, the structural elements 50, 51 and 52 are located remotely from the fuel containing portion 16 thereby preventing localized heating. A cross-sectional view of the embodiment of Figure 12 is shown in Figure 13. It may be noted from Figure 13 that the bottom grid 50 with brace 52 is a sub-assembly which is inserted into the end of the coolant inlet fitting 31 and welded or otherwise fixed in place as at 56. The upper end of the fuel assembly, i.e., in the fuel handling adapter 34, has a similar grid arrangement. Here again a modification similar to Figure 10 may be utilized at the coolant inlet end to reduce turbulence.

Fig. 14 shows a perspective view of the inlet end of a fuel assembly in which three concentric cylindrical fuel pins are supported and Figure 15 is a cross-sectional view of this embodiment of the present invention. Specifically, three fuel pins 60, 61 and 62 of different diameters (see Charts I through III) are placed in concentric relation, so that annular volumes 63, 64 and 65 surround their outside surfaces for the passage of coolant. The center fuel pin 62 has a central aperture 26. The inner tubes 13 of each fuel pin have extension 66, 67 and 68 respectively, so that the grid assembly is spaced from the fissionable material 16. The grid consists of four (in the preferred embodiment) cross arms 69 which have their outer extremities 70 fixed into slots 71 in the coolant inlet fitting 31. The inner extremity 72 of each arm 69 is fixed to the tubular extension 68 of the inner fuel pin 62 and the intermediate portion of the arms 69 pass through slots 73 in the tubular extensions 66 and 67. The arms 69 are welded or brazed to extensions 66, 67 and 68 at the slots 73. A circular spacer and support 75 connects the four arms 69 at a point above the bottom closure 25 of the fuel pin 62. This circular spacer may be streamlined to function as a coolant flow directing baffle and to prevent turbulence around the bottom closure 25. Furthermore, more than one such spacer may be utilized, e.g., one for each bottom closure 25.

Figure 15 shows the arms 69, the extremities 70 and slots 71 of the upper grid which is similar to the bottom grid described above.

Fig. 16 shows a modified fuel element assembly utilizing short length fuel pins (e.g. 18 inches) made in accordance with the method described above. In this embodiment the fuel element assembly 80 has a coolant inlet fitting 31, a nozzle 32, a fuel containing section 33;

and a fuel handling adapter 34 including spring side members 35 and a lifting bar 36.

In this embodiment the fuel pins 22 number twenty-seven, i.e., an array of nine with three levels, integrally connected. The fuel handling adapter 34 and coolant inlet fitting 31 have grids 81 which are integrally connected to the extended portions 54 of the center tubes 13 of each of the pins of the adjacent level of fuel pins.

Fig. 17 shows a cross-sectional view of the end grids 81. Specifically the grid 81 is made up of three tube engaging members 83 and two cross support members 84 which are slotted at their cross joints 85 and welded or otherwise attached together. The ends 86 of each of the tube engaging members 83 and cross support members 84 have a reduced thickness portion which fits into appropriate slots 87 in the coolant inlet fitting 31 and fuel handling adapter 34 and are welded or otherwise integrally attached thereto.

The tube engaging members 83 each have three circular portions 89 which fit around the extension 54 of tube 13 and are integrally attached thereto by welding or brazing. In this manner the structure of the grids 81 is remotely located with respect to the fuel containing portion. It is also apparent that the central aperture 26 of each of the fuel pins is unobstructed and that the coolant may blow through the aperture 26 or around the outside surfaces of each fuel pin.

Fig. 18 shows the spacer support center grid structure indicated generally at 90. These grids 90 not only provide a means for attaching the ends of extensions 54 between the various levels but also provide a lateral support means to increase the structural integrity without intruding large amounts of neutron absorbing materials.

It is apparent from Fig. 18 that three cross members 91 having three circular portions 92 provide support between the fuel pins of a group. The circular portions 92 fit around the extensions 54 of the inner wall 13 of the fuel pins and are welded or brazed thereto at 93. Three of the groups each of three individual pins are supported in spaced relation by cross bars 94 which are welded or otherwise integrally attached at their ends and centers to the cross members 91.

As is apparent from Fig. 16 the inner walls 13 of each of fuel pins 22 are connected so that a continuous central aperture 26 is provided along the entire length of each sub-assembly of three longitudinally supported fuel pins. In this manner the fuel pins may be fabricated in shorter lengths, e.g., eighteen inches and the required number stacked to obtain the length desired for a particular reactor core. Although a particular array has been shown and described other arrays, i.e., circular, triangular, may be utilized and the number of fuel pins may be varied to suit the particular reactor core.

The fuel pins and fuel assemblies above described all have the advantage of utilizing $UO_2$ or $UO_2=ThO_2$ solid solution compound, the latter being utilized in the preferred embodiment. The thorium contained in the fuel pins 22 acts as a fertile material and is converted to uranium 233 in the reactor core during operations. For a more detailed discussion of the properties and characteristics of $UO_2$, $UO_2=ThO_2$ as well as other ceramic type fuels which may be utilized in the present invention see Nucleonics, August 1958, vol. 16, No. 8, pages 77–104, the disclosure of which is incorporated herein and made a part hereof.

It should be noted that in low power research reactors it may not be necessary to increase the density of $UO_2$ or other powder above the density obtained by the cold pressing operation. Thus, the fuel pin may be fabricated and processed to have any desired density dictated by nuclear considerations. As a result the swaging process may in some applications be eliminated for a particular fuel pin or it may be desirable to have different densities in the core as a function of radius and therefore a different fissionable material to moderator ratio as a function of radius.

Although the preferred embodiment has been described in terms of a fuel assembly having nine fuel pins in a square array it is within the purview of this invention to utilize a larger or lesser number of fuel pins and to arrange them in rectangular or other geometric arrays. Further, the present invention is not limited to the specific details of the particular embodiments described since many modifications will be apparent to those skilled in the art, the scope of the present invention being limited only by the appended claims.

What is claimed is:

1. A method of fabricating a fuel element comprising the steps of placing a fissionable material containing powder in the annular volume between two tubes, compacting said powder to a first density, sealing said annular volume, and swaging the inside surface of the inside tube to expand the diameter of said inner tube and further compact said powder in said annular volume to raise the density of said powder and retain substantially malleable wall members.

2. A method of fabricating a fuel element comprising the steps of connecting two tubes in concentric arrangement to form an annular volume with one end of the annular volume sealed, compacting a fissionable material containing powder in said annular volume, said compacted material filling said annular volume, sealing the open end of said annular volume, swaging the exposed surface of the inner concentric tube to increase its diameter thereby increasing the density of said compacted powder.

3. A method of fabricating a fuel element comprising the steps of connecting two tubes in concentric arrangement to form an annular volume, sealing one end of the annular volume, placing said tube arrangement in a supporting structure to prevent displacement of said tubes, compacting a fissionable material containing powder in said annular volume, said compacting material filling said annular volume, sealing the open end of said annular volume, supporting said sealed end against displacement, removing the portion of the supporting structure adjacent the inner surface of the inner tube, swaging said inner surface to increase its diameter and to further increase the density of said fissionable material containing powder.

4. A method of fabricating a fuel element comprising the steps of connecting two tubes in concentric arrangement to form an annular volume having one end of the volume sealed by said connection, compacting a fissionable material containing powder in said annular volume to a first density, said compacted powder filling said annular volume, sealing the open end of said annular volume, expanding the inner tube of said concentric tubes to compact said powder to a second density, said expanding step comprising ball swaging to retain substantially malleable wall members.

References Cited in the file of this patent
UNITED STATES PATENTS

| | | |
|---|---|---|
| 2,805,473 | Handwerk et al. | Sept. 10, 1957 |
| 2,816,042 | Hamilton | Dec. 10, 1957 |
| 2,818,605 | Miller | Jan. 7, 1958 |
| 2,838,452 | West et al. | June 10, 1958 |
| 2,864,758 | Shackelford | Dec. 16, 1958 |
| 2,879,216 | Hurwitz et al. | Mar. 24, 1959 |

OTHER REFERENCES

Nucleonics, November 1956, pp. 138–144.
HW–52729, Sept. 18, 1957.